Sept. 15, 1970  W. H. BLACK ET AL  3,528,158
AUTOMATIC DRAWER FORMING AND ASSEMBLING MACHINE AND
METHOD AND PRODUCT THEREOF
Filed July 12, 1968  8 Sheets-Sheet 2

INVENTORS
WILLIAM HORACE BLACK
CLARENCE EDWARD PITTMAN
GEORGE E. VON GAL, JR.
BY *Newton, Hopkins*
*& Ormsby*
Attorneys

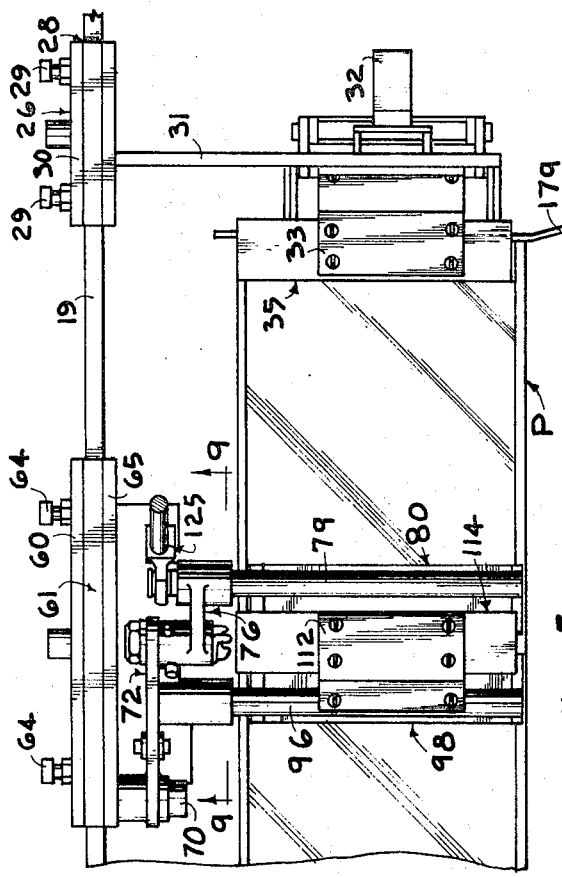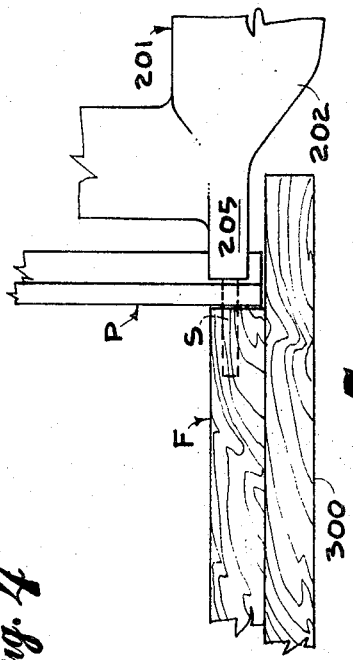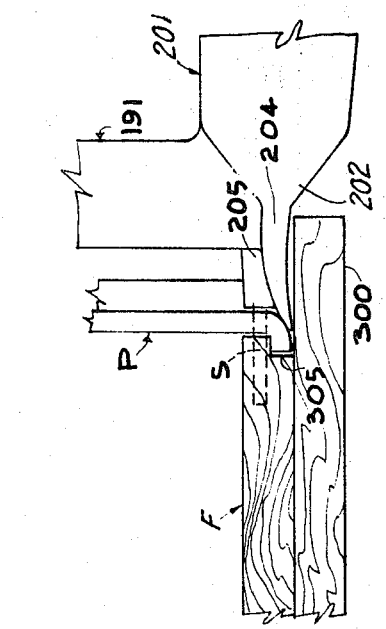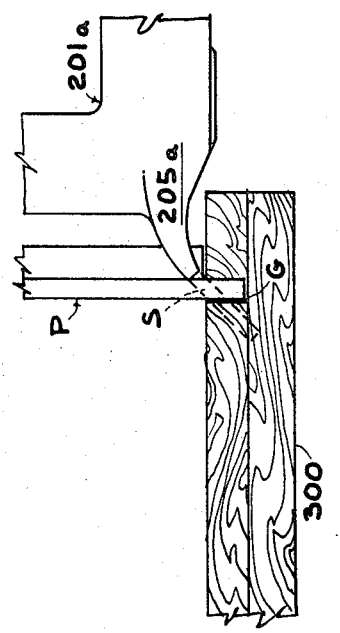
INVENTORS
WILLIAM HORACE BLACK
CLARENCE EDWARD PITTMAN
GEORGE E. VON GAL, JR.
BY
*Newton, Hopkins,*
*& Ormsby*
*Attorneys*

INVENTORS
WILLIAM HORACE BLACK
CLARENCE EDWARD PITTMAN
GEORGE E. VON GAL, JR.

BY Newton, Hopkins,
& Ormsby
Attorneys

INVENTORS
WILLIAM HORACE BLACK
CLARENCE EDWARD PITTMAN
GEORGE E. VON GAL, JR.
BY *Newton, Hopkins, & Ormsby*
Attorneys Sept. 15, 1970   W. H. BLACK ET AL   3,528,158
AUTOMATIC DRAWER FORMING AND ASSEMBLING MACHINE AND
METHOD AND PRODUCT THEREOF
Filed July 12, 1968   8 Sheets-Sheet 8

INVENTORS
WILLIAM HORACE BLACK
CLARENCE EDWARD PITTMAN
GEORGE E. VON GAL, JR.

BY *Newton, Hopkins,*
*& Ormsby*
*Attorneys*

United States Patent Office 3,528,158
Patented Sept. 15, 1970

3,528,158
AUTOMATIC DRAWER FORMING AND ASSEMBLING MACHINE AND METHOD AND PRODUCT THEREOF
William Horace Black, 3060 Pharr Court N., and Clarence Edward Pittman, 2479 Peachtree Road, Apt. 1116, both of Atlanta, Ga. 30305, and George E. von Gal, Jr., P.O. Box 1241, Montgomery, Ala. 36102
Filed July 12, 1968, Ser. No. 744,578
Int. Cl. B23p 19/04
U.S. Cl. 29—200
4 Claims

ABSTRACT OF THE DISCLOSURE

An automatic drawer forming and assemblying machine wherein spaced transverse supports retain therebetween a median portion of a plastic sheet or panel in parallel relationship above a drawer front. The outer portions of the panel protrude in opposite directions beyond the supports. The machine supports a rectangular drawer bottom perpendicular to and between the drawer front and the median portion of the panel. Heating elements, at spaced intervals, heat narrow transverse intermediate increments of the plastic panel above the supports, to render these narrow portions pliable. Pivotally mounted fold plates, outwardly of the heating elements bend or deform the outer portions of the plastic panel downwardly and inwardly about the pliable increments to abut the sides of the drawer bottom and so that the ends of the panel abut opposed sides of the drawer front. Staplers, mounted on the machine, move inwardly adjacent the ends of the plastic panel to staple the lower end portions of the plastic panel to the sides of the drawer front.

Additional heating elements are provided for heating the end portions of the panel so that they are pliable to facilitate the stapling operation. Also, fingers are provided, to operate in conjunction with the staplers, to tuck in the ends of the plastic panel into the drawer front.

Modifications include a mechanism for moving a slotted drawer front upwardly so as to insert the ends of the plastic panel into slots in the drawer front after deformation of the panel.

The process or method is recited above in describing the machine for carrying out the process.

The drawer thus formed has its back wall and two sides formed from the single panel of plastic, the panel having a recess or channel which receives and restricts the side and back edges of the drawer bottom. The upper flange of the plastic panel projects outwardly, on the opposed sides, and projects rearwardly of the back side, the flange curving around the corners. A fillet is used in the event that the flange is cut, rather than being drawn around the corner. The tucked-in ends of the plastic panel and the staples retard shearing of the drawer front from the plastic panel. The drawer has a drawer guide attached manually during the assembly process.

BACKGROUND OF THE INVENTION

Field of invention

This invention relates generally to the manufacture of drawers for furniture and the like and more particularly to an automatic drawer forming and assemblying machine and method and product thereof.

Description of the prior art

Prior art drawers which have usually been manufactured entirely of wood, include a drawer front, a bottom, side walls, and a back wall nailed or glued together, by hand. More recently, metal and plastic have been utilized to form the elements of the drawers, however, the design of these prior art drawers are such that the drawers did not lend themselves easily to mass production. When plastic has been used, for example, each size drawer has required a separate die or mold. Furthermore, the plastic drawer has required manual assembly to its drawer front.

SUMMARY OF THE INVENTION

These and other problems and disadvantages associated with the prior art manufacture of drawers are intended to be overcome by the apparatus, method, and the drawer itself of the present invention.

Briefly, the apparatus of the present invention includes means for positioning a preformed drawer front in a prescribed position and a preformed drawer bottom perpendicular thereto. A positioning and deforming mechanism is provided for receiving and positioning, in spaced parallel relationship to the drawer front, a panel of deformable material, such as plastic, out of which the walls of the drawer are to be formed. This mechanism includes means for heating and bending transverse intermediate portions of the panel so as to form the panel into a contour conforming to the shape of a drawer bottom, whereby the side walls and end wall are formed around the bottom. Stapling guns or other securing means are positioned adjacent the drawer front for moving automatically into positions for passing staples through the ends of the material and into the drawer front. The method of invention includes the steps carried out by the machine of the present invention (which steps could also be carried out by hand) wherein the plastic panel is preshaped to form the side walls and end wall around the drawer bottom and the ends of the panel as secured to the drawer front.

The product of the present invention is the drawer construction resulting from carrying out the method described above and in which the ends of the side walls of the drawer are tucked in adjacent the drawer front for re-enforcement. Furthermore, the drawer has an upper flange which, at the corners formed by the side walls and end wall, are connected by drawn portions of the flange or by re-enforcement.

These and other features and advantages of the invention will be more readily understood upon consideration of the following specification and accompanying drawings wherein like characters of reference designate corresponding parts throughout and in which:

BRIEF DESCRIPTION OF THE DRAWINGS

FIG. 4 is a top plan view of the right hand portion of the machine illustrated in FIG. 3;

FIG. 5 is an enlarged view of a detail showing a modified form of stapling gun utilized in the machine illustrated in FIG. 1 for passing staples diagonally into the corner portions of the drawer being formed;

FIG. 6 is a view similar to FIG. 5 and illustrating the stapling gun of the mechanism of FIG. 1, in operation;

FIG. 7 is a view similar to FIGS. 5 and 6 and showing still another modified form of stapling gun being employed when a slightly different drawer is to be formed;

These figures and the following specification disclose specific embodiments of the invention; however, the inventive concept is not limited thereto since it may be embodied in other forms.

DESCRIPTION OF ILLUSTRATIVE EMBODIMENTS

Figure 1:
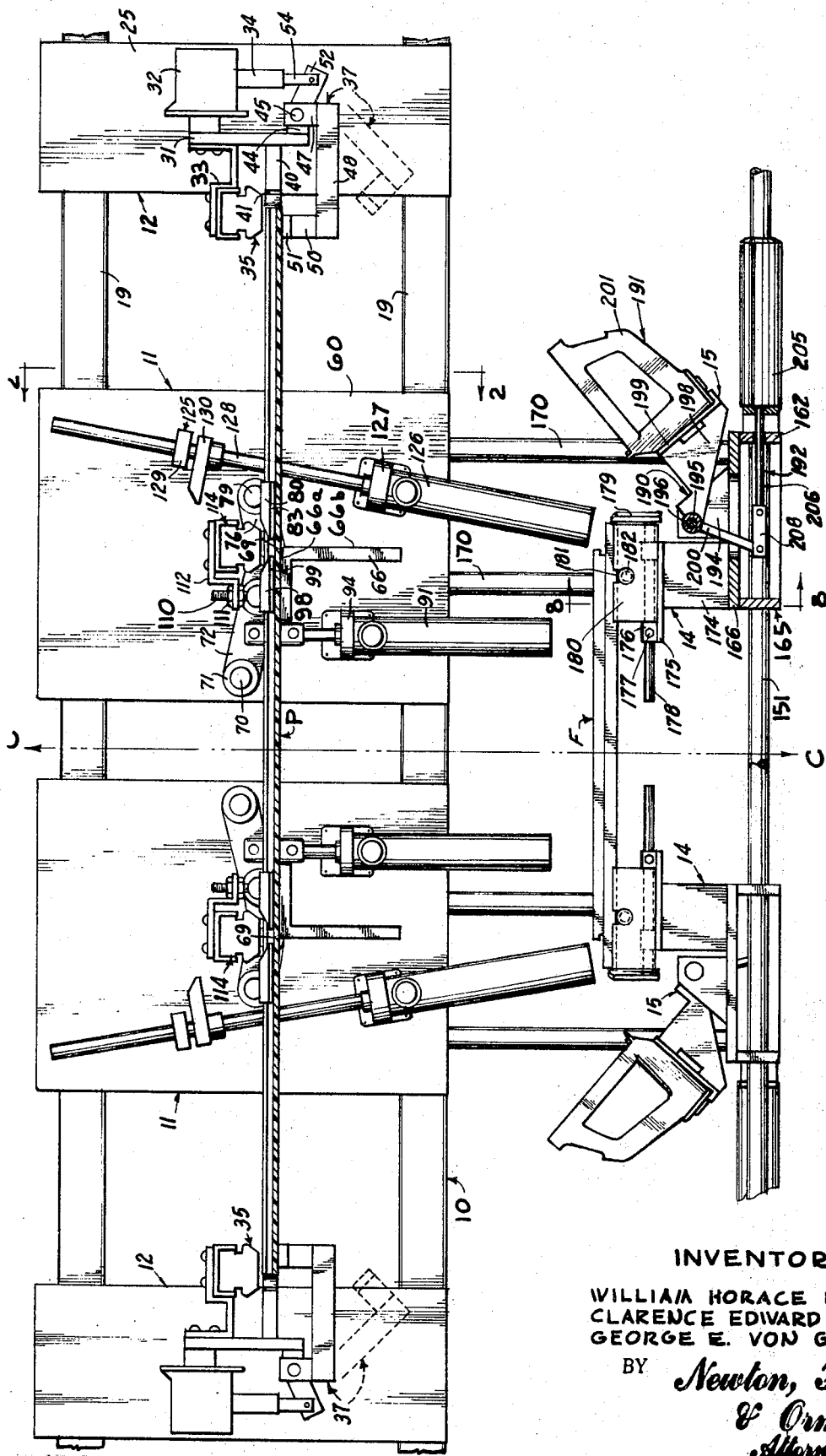
FIG. 1 is a fragmentary front elevational view of an automatic drawer forming and assemblying machine constructed in accordance with the present invention and having a plastic panel (shown in cross section) in position to be deformed and secured to a drawer front.
Figure 2:
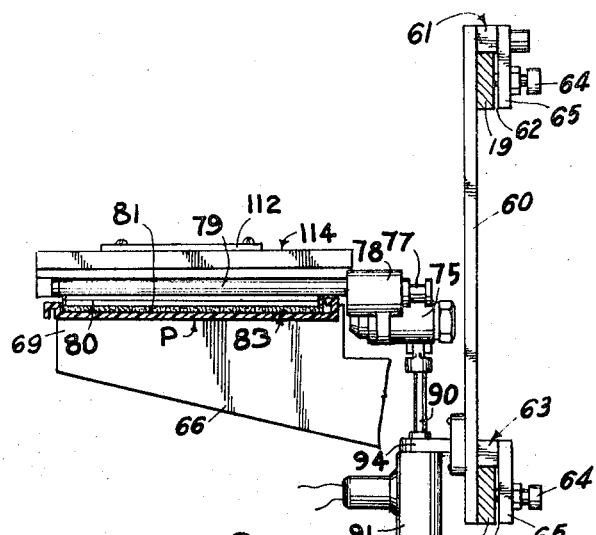
FIG. 2 is a vertical sectional view taken substantially along line 2—2 in FIG. 1.

Referring now in detail to the embodiments chosen for purpose of illustration, the present machine for forming and assemblying machine drawers is essentially symmetrical, as viewed in FIG. 1. Therefore, the mechanism on opposite sides of the vertical center line C are complementary.

The basic parts of the machine include the frame 10, the opposed panel supporting and deforming mechanisms which are denoted by numeral 11, the opposed panel positioning and end heating assemblies 12, the opposed drawer front supporting members 14 and the opposed fastening mechanisms 15.

The function of the panel supporting and deforming mechanisms 11 are to receive clamp and hold, by its intermediate portion, the plastic panel P and to heat spaced narrow transverse straps of the panel, the panel may be bent about these spaced slidable strap portions for disposing the outer wings or side wall portions of the panel parallel to each other and perpendicular to the median or end wall portion.

Figure 16:
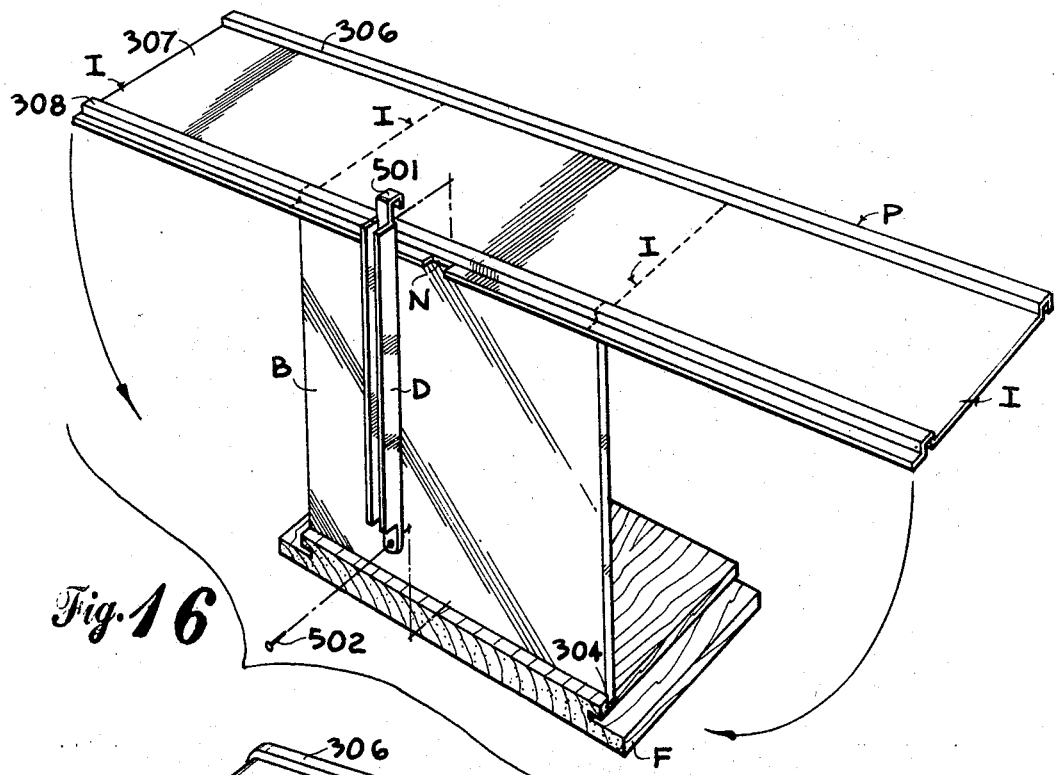
FIG. 16 is a schematic exploded perspective view illustrating the drawer front, drawer bottom, and plastic panel as positioned in the machine of FIG. 1, prior to the heating and bending of the plastic panel, and illustrating in exploded form the drawer guide; and, FIG. 17 is a perspective view of the drawer of FIG. 16 after it is completed.
Figure 17:
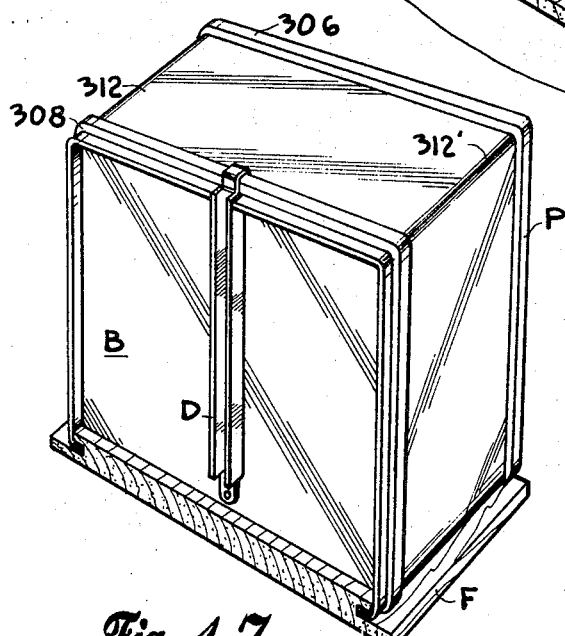

Thus, the panel P is wrapped around three of the four side edges of the drawer bottom B as seen in FIGS. 16 and 17.

The function of the panel positioning end heating assemblies 12 is to position the panel P properly in the machine, and support it during an initial phase as the end portion of the panel P is heated to a condition of pliability. By heating the end portions of the panel P simultaneously with the heating of the transverse strips so that the end portions are heated as the wings are brought into registry with the opposed sides of the drawer front F, the end portions may be tucked into the drawer front and the staples passed through the end portions of the panel P and into the sides of the drawer front F.

The function of the drawer front support members 14 is to support the drawer front parallel to and vertically below the median portion of the panel.

The function of the fastening mechanism 15 is to urge the end positions of the wings of panel P against the sides of the drawer front F and to secure these end portions in place. In the preferred embodiment, stapling guns are illustrated for the fastening mechanisms, however, other fastening devices may be used. The fastening mechanisms 15 also function to tuck-in the ends of the panel P into an undercut portion of the drawer front F. This may not be found desirable in all uses of the machine.

Another basic element of the machine is the electrical and pneumatic systems which enable the sequential operation of the elements so that spaced parallel transverse increments of the panel P are first heated sufficiently, then the panel P is deformed around the bottom B and thereafter the ends of the panel P are affixed to the drawer front F.

It will be understood by those skilled in the art that while under most conditions of use, the machine will be employed to produce complete drawers, the machine is also useful simply to deform the panel P so that the other essential steps can be carried out by hand to produce the completed drawer.

FRAME

The frame 10 includes a pair of spaced vertically disposed rear standards 16, the upper end portions of which are joined by a pair of vertically spaced, horizontally disposed, slide bars 19 which carry the positioning and deforming mechanisms 11 towards their central portions and the end heating assemblies 12 outwardly thereof on opposite sides of mechanisms 11.

A pair of front vertical standards 20 are positioned in front of the rear standards 16 by upper and lower end braces 21 and 23 extending rearwardly from the upper and lower ends of the standards 20 and connected to the rear standards 16. The front standards 20 are considerably shorter than the rear standards 16 and have the lower ends thereof aligned with the rear standards 16. Also connecting the lower ends of the front standards 20 is a tie member 22 to maintain the rigidity of the lower portion of the frame 10. Spaced upwardly from the tie member 22 and extending between standards 20 is a re-enforcing strut 24. It will therefore be seen that the frame 10 is an open construction of a stepped rectangular design.

PANEL POSITIONING END HEATING ASSEMBLIES

As has already been noted, the end heating assemblies 12 are adjustably, i.e., slidably carried by the bars 19. Since the right and left end heating assemblies 12, as seen in FIG. 1, are complementary, only the right end heating assembly 12 will be described in detail.

Figure 10:
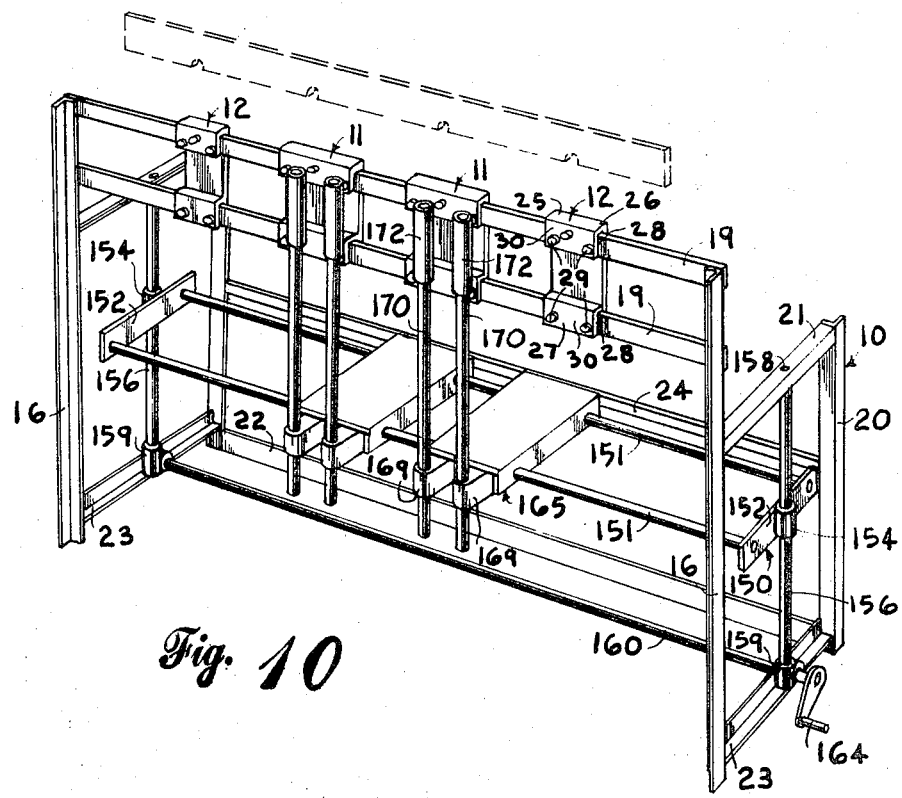
FIG. 10 is a perspective view, on a reduced scale, of the frame of the machine illustrated in FIG. 1.

Referring to FIG. 10, each end heating mechanism 12 comprises a vertically disposed support plate 25 having an inverted downwardly turned U-shaped portion 26 at its upper end and a downwardly turned U-shaped portion 27 at its lower end. The opposed U-shaped portions 26 and 27 therefore define recesses 28 which respectively receive the upper and lower bars 19 therethrough so that the support plate 25 will be maintained in a vertical position as the end heating mechanism 12 slides back and forth along the bars 19. Bolts 29 extend through the rearmost flanges 30 of the U-shaped portions 26 and 27 to selectively lock the support plate 25, thus the end heating mechanism 12, in position along the bars 19.

Figure 3:
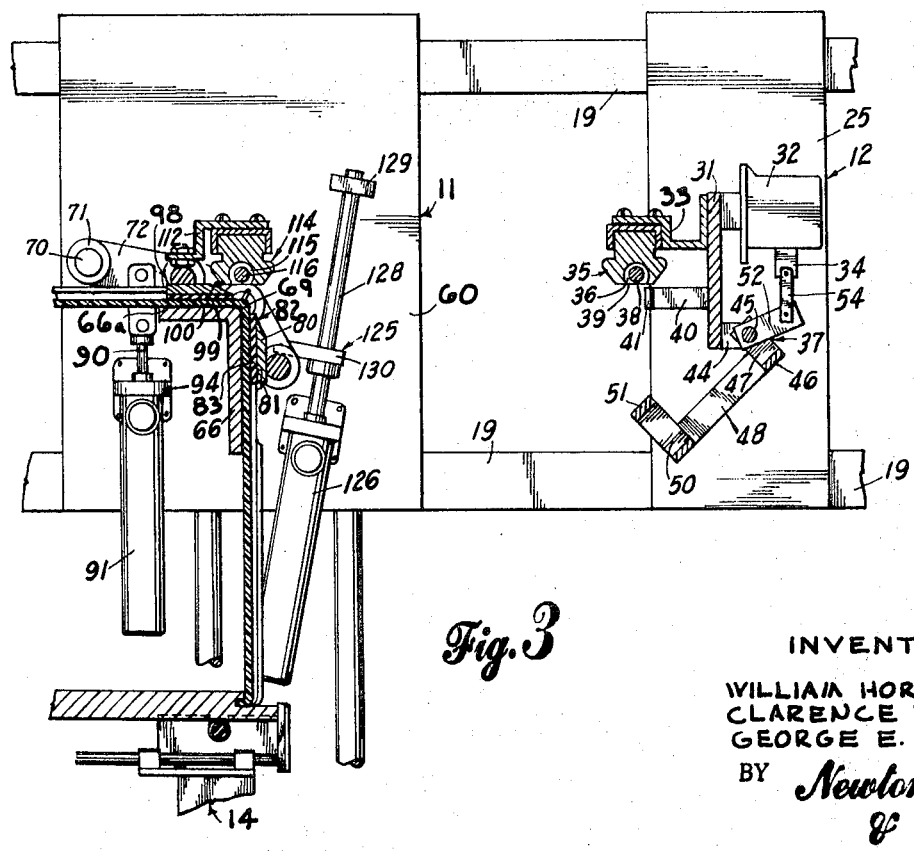
FIG. 3 is a vertical sectional view of the right hand portion of a machine illustrated in FIG. 1.

Extending forwardly of the support plate 25 and substantially perpendicular thereto is a support beam 31 which carries a solenoid 32 having a downwardly extending movable plunger core 34. Projecting inwardly toward center line C from beam 31 is a bracket 33 which supports at its end a transversely disposed heating element 35. The element 35 is of conventional design having a recess 36 therein, as best seen in FIG. 3 which opens along its bottom at numeral 39 for receiving a tubular electrical heater 38. It will be understood that element 35 provides a reflecting surface around the recess 36 so as to direct radiant heat, generated by the heater 38, downwardly, through the narrow rectangular transversely disposed opening 39 in the bottom of the element 35 for heating only the very end portion of the panel P.

Extending inwardly from the support beam 31 just below the element 35 are a pair of support brackets 40 which carry a transverse arresting plate 41 thereon, substantially parallel to the beam 31. The plate 41 has its forwardly extending end slightly bent outwardly to form an arresting surface for receiving the end of panel P.

Extending outwardly from the lower end portion of the support beam 31 is a panel support member, denoted generally by numeral 37. The function of member 37 is to provide temporary support for the ends of the panel P during an initial stage, as narrow transverse strips of the panel P are heated. The member 37 includes, as best seen in FIG. 3, a pair of spaced brackets 44 which journal a pivot rod 45. Fixed to the ends of the pivot rod 45 are the arms 47 of a U-shaped brace 46. Opposed parallel inwardly extending arms 48 project from brace 46 beneath beams 31 and at their innermost ends carry a U-shaped brace member 50. The upper ends of bracket 50, in turn, carry a support table 51. When the support table 51 is disposed horizontally, as illustrated in FIG. 1, it supports the end portion of panel P; however, when it is moved to the position shown in FIG. 3, this clears the panel P so that the panel P may be bent or deformed.

A control arm 52 extends radially outwardly from the mid-portion of rod 45, the outer end of arm 52 being pivotally connected to the lower end of plunger 34, through a connector 54. Therefore, when solenoid 32 is energized, the plunger 34 will be extended so as to pivot rod 45 clockwise, as viewed in FIGS. 1 and 3, and move support table 51 to a position to support one end of the panel P. When, however, solenoid 32 is de-energized, the plunger 34 will be moved to its retracted position, thereby pivoting the support table 51 downwardly and outwardly out of engagement with the end of the plastic panel P.

When a different size drawer is to be manufactured, i.e., when a shorter or longer panel P is to be employed, the bolts 29 are loosened on each plate 25 and the plate then slides laterally along bars 19 (inwardly or outwardly as the case may be) to its new position. Then bolts 29 are tightened to fix the new position of each entire assembly 12. Furthermore, since the arresting plate 41 of each assembly 12 arrests outwardly the movement of the panel, the two assemblies 12 center the panel P in its appropriate position in the machine and prevent any applicable lateral movement of the panel P. Moreover, the proper positioning of assemblies 12, laterally, assures proper symmetry of the deformed panel P.

PANEL SUPPORTING AND DEFORMING MECHANISM

Referring to FIGS. 1–4, it will be seen that the right and left panel supporting and deforming mechanisms 11 are substantially mirror images of each other. Each supporting and deforming mechanism 11 comprises generally a vertically disposed support plate 60 having an upper inverted U-shaped portion 61 and a like lower U-shaped portion 63. The portions 61 and 63 define recesses 62 for slidably receiving the bars 19. Appropriate bolts 64 extend through the rearmost flange 65 of the U-shaped portions 61 and 63 for locking the forming mechanism 11 in prescribed laterally adjusted positions on bars 19.

Extending forwardly in cantilever fashion from the front central portion of each plate 60 is a main support 66 about which the panel P is bent. The upper surfaces 66a of supports 66 are flat and in the same horizontal plane with each other. Furthermore, the upper surfaces 66a are in a common horizontal plane with the upper flat surfaces of plates 51. Thus, when panel P is inserted into the machine, it will be simultaneously supported at spaced transverse intermediate increments by surfaces 66a and at its end portions by the upper surfaces of plates 51, provided solenoids 32 are energized. Since the common plane of surfaces 66a and plates 51 is parallel to bars 19, the plates 25 and 60 may be shifted toward or away from the centerline C without altering the heights of the respective surfaces.

The supports 66 also respectively have vertical outer surfaces 66b which are parallel and spaced from each other while being perpendicular to the surfaces 66a. Each surface 66a merges with its associated surface 66b along a common convex corner edge 69, the corner edges 69 being 90° arcuate surfaces around spaced opposed parallel transverse axes.

Inwardly of the edges 69 and surfaces 66a, and preferably above the common plane of surfaces 66a, each mechanism 11 includes a stub shaft or pivot pin 70 which protrudes forwardly from plate 60. Each pivot pin 70 carries, for rotation, a bushing 71 which, in turn, carries a radially outwardly extending primary pivot arm 72, by its proximal end.

Figure 9:
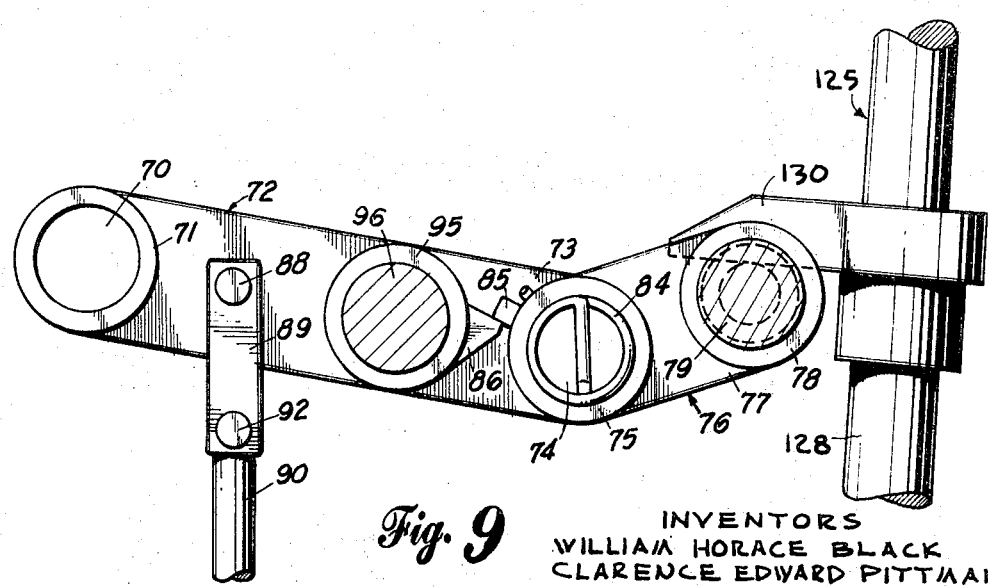
FIG. 9 is an enlarged view of a detail showing the linkage arrangement for operating the supporting and deforming mechanism of the machine illustrated in FIG. 1.

The distal end of each arm 72 includes, as best seen in FIG. 9, a pivot pin 74 which, in turn, rotatably carries a bearing 75. A secondary pivot arm 76 extends radially from bearing 75 generally in the same direction as the primary pivot arm 72; however, while being movable in an arcuate path in a vertical plane about stub shaft 70, it nevertheless is also pivotable about pivot pin 74 in the same vertical path.

The distal end of pivot arm 76 is provided with a bushing 78 which snugly receives, by an intermediate portion, a transversely extending shaft 79. The rearwardly extending portion of shaft 79 is provided with an annular recess 77, seen best in FIG. 2. This annular recess 77 serves as a camming surface, as will be explained more fully hereinafter.

The forwardly protruding portion of shaft 79 extends parallel and is spaced outwardly of its associated edge 69. Mounted on the bottom periphery of the forwardly protruding portion of shaft 79 is a rectangular clamping and bending plate 80, the bottom surface 81 of which is flat and the upper surface of which is provided with a beveled inner edge 82, the upper surface of which tapers toward surface 81. The bottom surface 81 is provided with a thin rectangular resilient pad 83 which is urged into engagement with the upper surface of panel P when the machine is in operation. The inner edge 82 is in parallel to and outwardly of pivot pin 74.

The secondary arm 76 is constantly urged upwardly by a spring 84 carried on the pin 74. Connected between the pin 74 and arm 76 is a stop to limit the upward movement of the arm 76. This stop includes a stop pin 85 on the bushing 75 and an appropriate stop lug 86 on the primary arm 72 adapted to engage each other and stop the upward movement of the arm 76.

Attached to an intermediate portion of primary arm 72, through a pinned connection 88 (seen best in FIG. 9) is a connecting device 89 carried by piston rod 90 of a fluid cylinder 91. The fluid cylinder 91 is mounted on support plate 60 by a support flange 94. Upon activation of cylinder 91, piston rod 90 may be extended and retracted for selectively raising and lowering the primary arm 72.

Between the device 89 and pivot pin 74, arm 72 is provided with a bushing 95 which snugly receives one end of a transversely extending shaft 96. Shaft 96 projects over its associated support 66 and carries, secured to its lower periphery, a clamping plate 98 which is complementary to and inwardly of the clamping plate 80. Plate 98 has a flat resilient pad 99, similar to pad 83, on its bottom surface and an outer beveled edge 100 which is adjacent but spaced from and parallel to edge 82.

The clamping mechanism 11 is so dimensioned that the pivot pin 74 is approximately the same distance from shaft 70 as is the distance from corner edge 69 to shaft 70. The opposed edges 82 and 100 are on opposite sides of the axis of pivot pin 74.

When the piston rod 90 is extended, the arms 72 and 76 are rotated counterclockwise, as seen in FIG. 1, to raise the contact plates 80 and 98 as to permit the panel P to be inserted into the device. Since the spring 84 yieldably urges the arms 76 counterclockwise with respect to the pin 74 until the stop lug 86 contacts the stop pin 85, the contact plates 80 and 98 will both be moved together and will be raised by the piston rod 90 above their associated surface 66a. When the panel P has been placed on surfaces 66a, the piston rod 90 is retracted, thereby moving the clamping plates 80 and 98 arcuately downwardly into contact with the upper surface of panel P to clamp panel P in place, the opposed pairs of surfaces 66a and the pad 99 forming clamp elements for holding the median portion of panel P firmly in place. After this operation, the heating operation is ready to be started.

A heating element 114, similar in construction to the heating element 35, is adjustably carried above and between the clamping plates 80 and 98 by a support bracket 112 which is adjustably carried by shaft 96.

In more detail for the purpose of providing vertical adjustment for element 114, an externally threaded upstanding stub shaft 110 is carried by shaft 96. This stub shaft 110 carries a pair of nuts 111 which sandwich and provide the sole support for bracket 112. By manipulation of nuts 111, the element 114 its raised or lowered.

The heating unit 114 being connected to shaft 96 will be raised and lowered with the shaft 96 for the insertion of a panel P. The element 114 is provided with a transverse recess 115 and a transverse heater 116 positioned immediately above edges 82 and 100. Therefore, where panel P is clamped in the machine and the heaters 116 engage, elements 114 will direct heat against narrow transverse straps or increments of Panel P immediately above corner edges 69.

Mounted on the outer side of the support plate 60 as seen in FIG. 1, is a bending assembly 125 which is effective to pivot the secondary arm 76 about pin 74 and bend the panel P around a corner edge 69 of support 66 until the outer wing of panel P is vertically disposed with the inner portion of the wing abutting surface 66b. This bending assembly 125 comprises a fluid cylinder 126 connected to the support plate 60 through a bracket 127 and having its piston rod 128 extending upwardly therefrom. The upper end of the piston rod 128 is slidably received through a guide 129. The cylinder 126 and piston 128 are located at the appropriate angle so that a control bracket 130, secured to the piston rod 128, will engage the annular recess 77 formed in the end of the shaft 79, as the piston rod 128 is retracted within the cylinder 126.

The downward movement of the bracket 130 pivots the secondary arm 76, and the clamping plate 80 connected thereto, downwardly and inwardly, to bend the panel P around a corner 69 of support 66 to form the side walls of the drawer. The bending assembly 125 is shown in its raised position in FIG. 1 and is shown in its lowered or bending position in FIG. 3.

DRAWER FRONT SUPPORTING MEMBER

Figure 8:
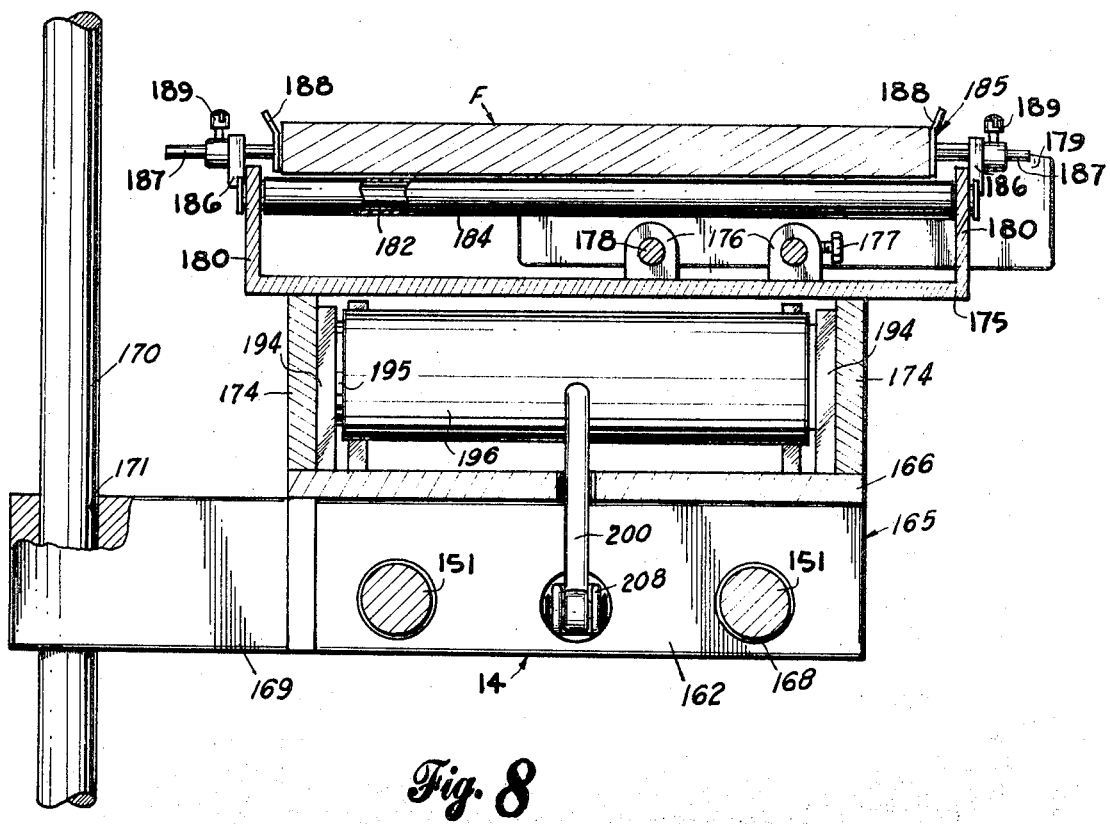
FIG. 8 is an enlarged vertical sectional view taken substantially along line 8—8 in FIG. 1.

Referring to FIGS. 1, 8, and 10, it will be seen that the opposed drawer front positioning mechanisms 14 are carried by a common vertically movable support frame, denoted generally by numeral 150. Frame 150 includes a pair of spaced, parallel, longitudinally extending slide rods 151 joined at their ends by transverse end plates 152. The end plates 152 are respectively provided with driving bosses 154 having internal threads which threadedly receive spaced, parallel, vertically disposed, externally threaded, driving rods 156.

The upper ends of driving rods 156 are respectively rotatably carried by a bearing bracket 158 mounted on upper end braces 23, while the bottom ends of driving rods 156 are respectively rotatably carried in an angle drive unit 159 on lower end braces 21. The rods 156 serve as the output shafts of the angle drive units 159 while a common drive shaft 160 connected between the two units 159 serves as the input shaft of both units 159. A manually operated crank handle 164 is fixedly attached to one end of the drive shaft 160 so that the support frame 150 may be selectively positioned vertically by manipulation of handle 164 to rotate shaft 160.

As best seen in FIG. 8, each drawer front positioning mechanism 14 includes a support assembly 165 slidably mounted for longitudinal movement on the slide rods 151. In more detail, each support assembly includes a pair of spaced, transversely disposed slide bars 162 which are received on and slidably carried by rods 151, there being provided bushings 168 in the slide bars 162 for journaling the bars 151. Each pair of slide bars 162 supports a flat rectangular platform 166 which is horizontally disposed beneath its associated panel supporting and deforming mechanism 11.

For respectively maintaining the support assemblies 165 in proper vertical alignment with their associated panel supporting and deforming mechanisms 11, rearwardly of the main frame, the support plate 60 is provided with mounting brackets 172 which carry the upper ends of vertically, downwardly extending, guide rods 170. Rods 170, at their lower end portions, protrude through apertures 171 in rearwardly extending journal members 169, the journal members 169 being carried respectively by and extending rearwardly from the support assemblies 165. Thus, when a support plate 60 or assembly 165 is moved laterally on bars 19 or on rods 151, it will carry with it its associated support platform assembly 165, as the case may be. Since the journal members 169 slidably receive the vertical rods 170, the support assemblies 165 remain free for simultaneous vertical adjustment by manipulation of crank handle 164.

As best seen in FIG. 8, mounted on each support plate 166 and extending upwardly therefrom are a pair of spaced upstanding front and back support brackets 174 which carry, by their upper ends, a U-shaped cross brace 175. Each cross brace 175 carries two pairs of spaced rod guides 176 which slidably receive a pair of spaced parallel longitudinally extending guide rods 178, joined at their outwardly extending ends by an alignment plate 179. The guides 176 are provided with locking screws 177 to lock the rods 178 in position. The function of the alignment plates 179 to abut the ends of the drawer front F and thereby prevent appreciable longitudinal movement of front F.

The upstanding ends 180 of the cross brace 175 have aligned upwardly opening slots 181 therein for receiving a support rod 182. It is therefore seen that the opposed parallel support rods 182 are so positioned at the end portions of frame F. Each support rod 182 is covered with a protective coating 184 to prevent damage to the drawer front F during the assembling operation. Since the frame F rests upon support rods 182 in a horizontal position, these rods 182 determine the vertical position of the drawer front F transversely of the machine, conventional adjustable front and back stops 185 are provided at the upper ends 180 of the positioning plates 175. Each stop includes upstanding bracket 186 which slidably supports an inwardly projecting rod 187 carrying a guide plate 188. Set screws 189 permit adjustment of the distance between plates 188.

FASTENING MECHANISMS

The right and left fastening mechanisms 15, as seen in FIG. 1, are complimentary, i.e., mirror images of each other, each fastening mechanism 15 including traveling member 190 carried by its associated support assembly 165, a fastening assembly 191 mounted on the traveling member 190, and a positioning assembly 192.

Each traveling member 190 includes a pair of spaced upstanding brackets 194 mounted on the support plate 166 outwardly of the support brackets 174. The brackets 194 mount a horizontal pivot pin 195 which rotatably carries a sleeve 196. Fixedly attached to the sleeve 196 and extending radially upwardly from each end thereof are a pair of spaced undercarriage braces 198 which mount a transversely extending undercarriage plate 199 across the upper ends thereof. A crank arm 200 is attached to the sleeve 196 and extends generally downward. Therefore, it will be seen that, as the arm 200 is rotated, the sleeve 196 and the undercarriage plate 199 will also be rotated.

The fastening assembly 191 is mounted on the undercarriage plate 199 and pivots therewith. As best seen in FIG. 6, the fastening assembly 191 of the preferred embodiment comprises a plurality of juxtaposed, solenoid actuated, pneumatic stapling machines 201 of conventional design. The stapling heads 202 of the stapling machines 201 have been modified, however, to form, below the discharge spout 205, a deforming anvil 204 to engage the lowermost edge portion of the plastic panel P after it has been disposed adjacent front F, as shown in FIG. 3. It will be understood that different fastening assemblies 191 can be utilized to attach the forward edge of the panel P to the drawer front F. Such modified forms are shown in FIGS. 5 and 7.

As seen in FIG. 1, the positioning assembly 192 includes a fluid cylinder 205 mounted on the outboard side of the end support member 162 of the support assembly 165 and having its piston rod 206 extending inwardly through an appropriate aperture in the member 162. The innermost end of the piston rod 206 is connected to the lower end of the pivot link 200 by a pinned connector 208. Therefore, as the piston rod 206 is extended, the fastening assembly 191 is swung in an arcuate path upwardly and inwardly so as to arrange the staple heads 202 adjacent the sides of the front, as illustrated in FIG. 6, so that the anvil 204 inserts the end portion of panel P into the slot 305 and disposes the discharge spout 205 adjacent panel P. Thereafter, automatically, the staples S of the stapling machines 201 are driven into the paneling, as illustrated in FIG. 6.

Of course, if desired, the anvil 204 may be deleted from this structure, in the event that the slot 305 is not present in the front F. In such a condition, the staple gun 201 operates as illustrated in FIG. 7.

In still other situations, it may be found desirable to discharge the staples S at 45 degrees, as illustrated in FIG. 5. Under such circumstances, the discharge spout 205a of staple gun 201a is disposed at 45 degrees to the panel P and the front surface 300 of the front F, as seen in FIG. 5.

Figure 15:
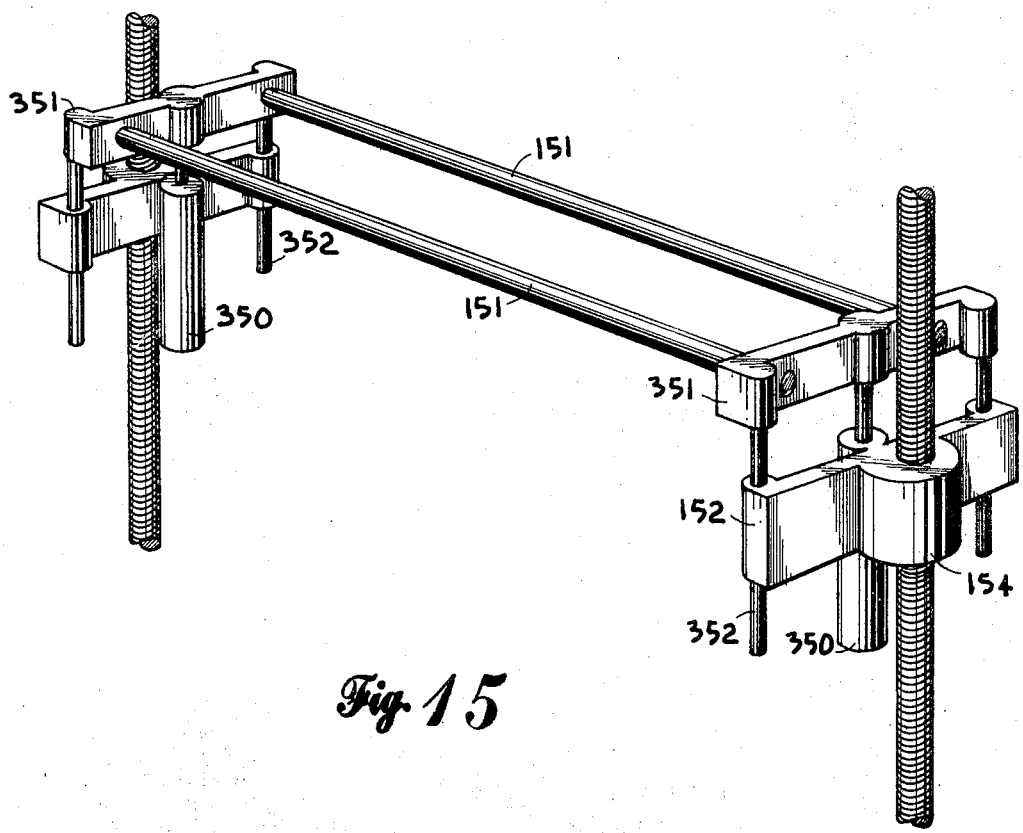
FIG. 15 is an enlarged perspective view of a modified form of the present invention showing a mechanism for lifting the drawer front into registry with the front edge of the drawer walls.

Referring now in detail to FIG. 15, it will be seen that, if desired, the bars 151 may be raised and lowered by hydraulic cylinders 350, so as to raise and lower the front F. This is particularly useful in the event that the front F is provided with simply a groove, rather than a cut-away portion. Under these conditions, the panel P is wrapped around the bottom B and, thereafter, the cylinders 350 are actuated so as to raise bars 151 and thereby lift the front F, inserting the ends of the panels P into appropriate grooves, such as groove G in FIG. 5.

Suitable brackets 351 are provided for supporting the rods 151 and suitable guide rods 352 assure the proper orientation of the bars 151 as they are raised and lowered by pistons 350.

CONTROL CIRCUIT

The operation of the machine is controlled by a control circuit B and fluid is supplied to the cylinders 91, 91', 126, 126', 205 and 205' from a conventional pressurized fluid source FS through solenoid valve V1 for cylinder 91, solenoid valve V2 for cylinder 126, solenoid valve V3 for cylinder 205, solenoid valve V4 for cylinder 91', solenoid valve V5 for cylinder 126', and solenoid valve V6 for cylinder 205'. The cylinders 91, 91', 126, 126', 205 and 205' are connected to the fluid source FS in parallel, and are of conventional design. The piston rods of the cylinders will be extended when no fluid under pressure is supplied thereto and will be retracted when fluid under pressure is supplied thereto.

The solenoids 32 and 32' are also of conventional design. The movable plungers or cores 34 and 34' of the solenoids will be retracted when the solenoids 32 and 32' are not energized and will be extended when the solenoids are energized.

The functional description of certain components of the control circuit C are set out hereinbelow:

| Component | Function |
| --- | --- |
| Valve V1 | Controls clamping of strip P by right forming mechanism 11. |
| Valve V2 | Controls bending of strip P by the right bending assembly 125. |
| Valve V3 | Controls position of right fastening assembly 191. |
| Valve V4 | Controls clamping of strip P by left forming mechanism 11. |
| Valve V5 | Controls bending of strip P by left bending assembly 125'. |
| Valve V6 | Controls position of left fastening assembly 191'. |
| Solenoid 32 | Controls position of right support table 51. |
| Solenoid 32' | Controls position of left support table 51'. |
| Solenoid S1 | Controls stapling of right stapling machine 201. |
| Solenoid S2 | Controls stapling of left stapling machine 201'. |
| Push-button switch PB-1 | Starts operation of the machine. |
| Push-button switch PB-2 | Activates solenoids S1 and S2 to staple strip P to drawer front F. |
| Foot switch SW1 | Controls valves V3 and V6 to position of fastening assemblies 191 and 191' and stops operation of machine. |
| Relay R1 | Controls valves V1 and V4 to clamp strip P and controls timing relay TR1. |
| Timing relay TR1 | Controls heating and bending of strip P. |

Figure 11:
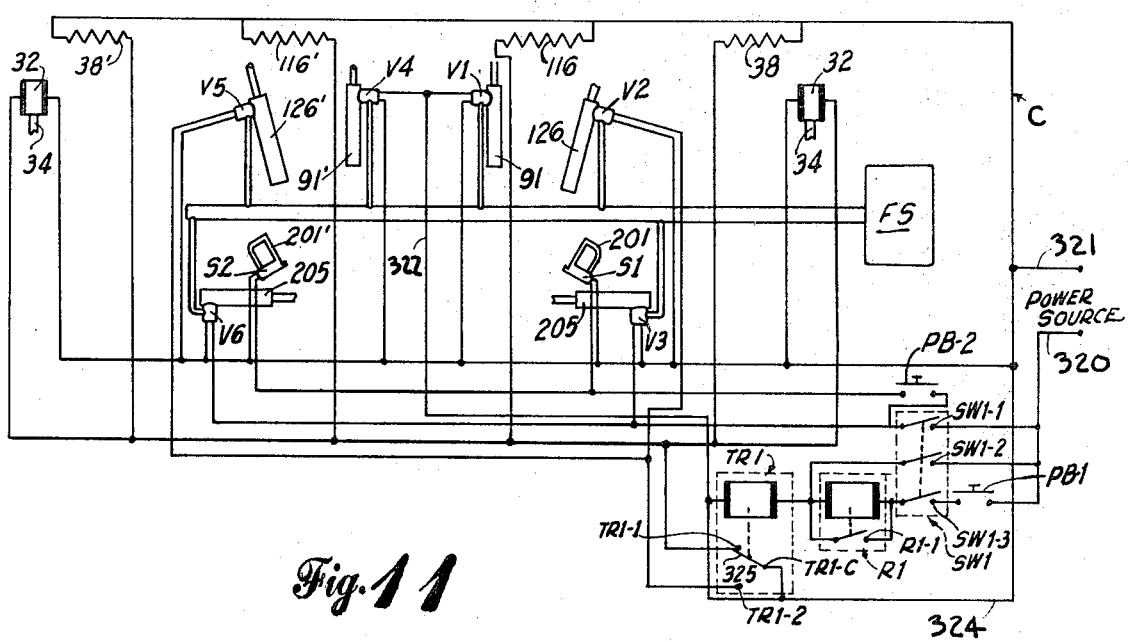
FIG. 11 is a schematic wiring diagram of the machine illustrated in FIG. 1.
Figure 12:
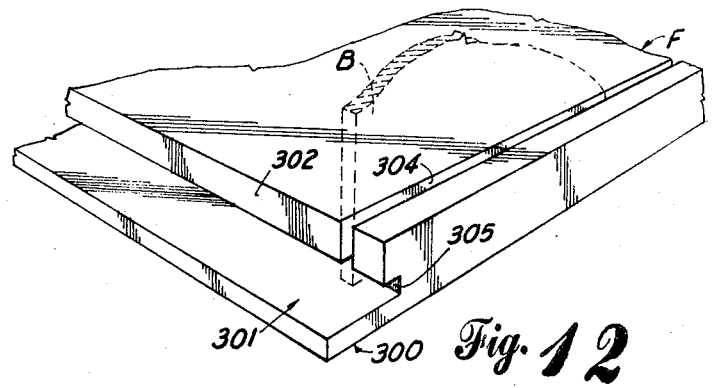
FIG. 12 is an enlarged fragmentary perspective view of one form of drawer front which is suitable for use in the machine of FIG. 1 for producing the drawer of the present invention.
Figure 13:
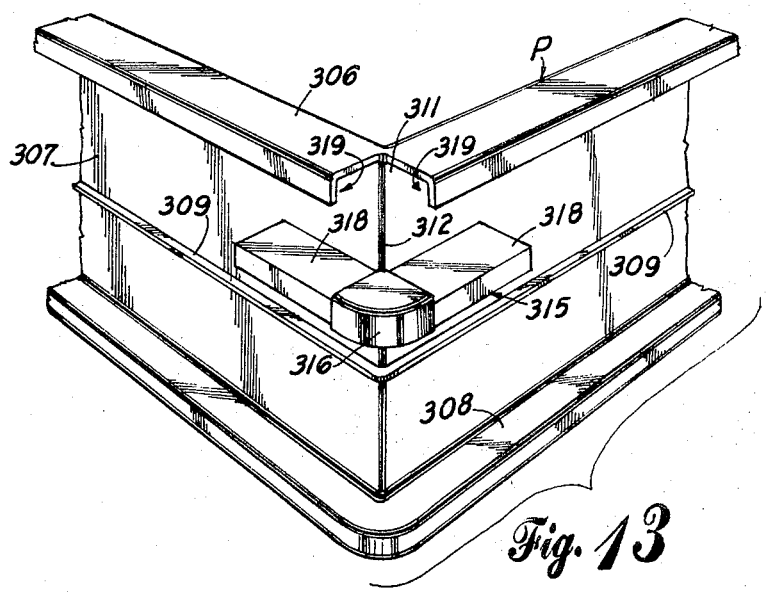
FIG. 13 is an enlarged fragmentary view showing the back corner portion of a drawer wall for producing a drawer constructed in accordance with the present invention.

Referring more particularly to FIG. 11, the control circuit C includes a common hot wire 320 and a common ground wire 321. Connected between wires 320 and 321 are the normally open contacts of push-button switch PB-1, the normally closed contacts SW1-3 of foot switch SW1, the coil of relay R1, and the coil of timing relay TR1 in series with each other. Normally open contacts R1-1 of relay R1 are connected in parallel across the coil of relay R1 and serve as a holding circuit when the push-button switch PB1 is released. Normally open contacts SW1-2 are connected in parallel across the contacts of switch PB-1, the contacts SW1-3 and the coil of relay R1 to act as a holding circuit when the relay R1 is de-energized upon the opening of contacts SW1-3.

Wire 320 is connected to wire 324 connecting the coil of relay TR1 to wire 321. One side of the solenoids of valves V1 and V4 are connected in parallel to wire 322 and the other side of the solenoids are connected to common ground wire 321. Therefore, it will be seen that as long as current is supplied through wire 322, the valves V1 and V4 will be opened to retract piston rods 90 and 90' to clamp the strip P on the corner support 66.

The common contact TR1-C of timing relay TR1 is connected to wire 324. The normally closed contact TR1-1 of relay TR1 is connected through the heaters 38, 38', 116 and 116' and solenoids 32 and 32', in parallel with each other, to ground wire 321. The normally open contact TR1-2 of relay TR1 is connected to ground wire 321 through the solenoids of valves V2 and V5 in parallel with each other. Relay TR1 is a conventional timing relay which will transfer the switch arm 325 connected to common contact TR1-C from contact TR1-1 to contact TR1-2 after a predetermined period of time. This predetermined period of time may be selected in conventional manner so that the heating time can be regulated in accordance with the kind and thickness of material utilized for the strip P.

Normally open contacts SW1–1 of switch SW1 in series with the solenoids of valves V3 and V5 in parallel are connected between wires 320 and 321. Therefore, it will be seen that when the foot switch SW1 is depressed, thereby closing contacts SW1–1, the piston rods 206 and 206′ will be retracted to move the fastening assembly 191 into an operative position.

The integral solenoids in each of the stapling heads 202 are connected in parallel with each other and in series with the normally open contacts of the push-button switch PB–2 between the wire 321 and the wire connecting the contacts SW–1 and the valves V3 and V6. Therefore, it will be seen that when the push-button switch PB–2 is depressed, the strip P will be fastened to the drawer front F provided contacts SW–1 are closed.

The drawer forming operation is started by depressing the push-button switch PB–1. Since the contacts SW1–3 are closed, relay R1 and timing relay TR1 are energized and contacts R1–1 are closed to hold relays R1 and TR1 energized. This opens valves V1 and V4 to clamp the strip P onto the corner support 66. The heaters 38, 38′, 116 and 116′ are also energized to heat the strip P at the points where the bends 306 and 306′ are to be made, and on the ends of the strip P since the contact TR1–1 remains closed until a selected predetermined amount of time has elapsed. The solenoids 32 and 32′ are also energized while the heaters are heating to raise the support tables 51 and 51′ under the ends of the strip P to prevent the ends from sagging. After the selected predetermined amount of time has elapsed, the timing relay TR1 transfers the switch arm 325 to make contact TR1–2 and break contact TR1–1. This causes the heaters 38, 38′, 116 and 116′ as well as the solenoids 32 and 32′ to be de-energized and the valves V2 and V5 to be opened to retract the piston rods 128 and 128′ and form the side walls of the drawer. It will also be noted that since the movable cores or plungers 34 and 34′ are automatically retracted upon de-energizing solenoids 32 and 32′ so that the support tables 51 and 51′ do not interfere with the bending operation.

When the foot switch SW1 is depressed by the operator after the strip P has been formed, contacts SW1–1 are closed so that the piston rods 206 and 206′ will be retracted to pivot the fastening assemblies 191 and 191′ into operating position. This serves to deform the forward ends of the formed strip P into the groove 305.

Contacts SW1–2 are also closed when the switch SW1 is depressed and contacts SW1–3 are opened. This de-energizes relay R1 and opens contacts R1–1 but the valves V1 and V4 are maintained open through contacts SW1–2 and the relay TR1 also remains energized through the contacts SW1–2. This keeps the strip P clamped to the support 66 and in a formed configuration.

Switch PB–2 is then depressed to cause staples S to be ejected from the stapling machines 201 and fixedly attach the strip P to the drawer front F. The foot switch SW1 is then released to open contacts SW1–1 and SW1–2 and close contacts SW1–3. This de-energizes relay TR1 and closes valves V1 and V6 to open the machine for removal of the completed drawer.

OPERATION

From the foregoing description, the operation of the present device should be apparent. First, the machine is adjusted for the size drawer to be manufactured. This is done by manipulation of the crank 164 which raises or lowers the front supporting members 14, simultaneously. Furthermore, the width of the drawer and the depth of the drawer are arranged by manipulation of the mechanisms 11 and 12, the distance between mechanisms 11 and 12 on one side determining the length of the side and the distance between the respective mechanisms 11 determining the width of the drawer.

The drawer front F is placed in the machine so that the finished surface 300 is resting on the support rods 182 and 182′ and is held in position by the alignment plates 179 and 179′ and the alignment mechanisms 185 and 185′. The drawer front F is positioned so that the groove 304 lies in the forward portion of the machine. The drawer bottom B is then positioned in the groove 304 and the strip P inserted over the corner supports 66 and 66′ and between the guide plates 41 and 41′. The channel 308 is positioned on the rear edge of the bottom B.

The operator then depresses push-button switch PB–1 to start the drawer forming operation. This opens valves V1 and V4 to move the clamping plates 80, 80′, 98 and 98′ into contact with the strip P to clamp the strips P onto the horizontal legs 66a and 66a′ of the corner supports 66 and 66′. This also causes the solenoids 32 and 32′ to be energized and raise the support tables 51 and 51′ under the ends of the strip P to support the same, and starts operation of the heaters 38, 38′, 116 and 116′ to heat the ends of the strip P and the points where the bends 312 and 312′ are to be made.

The heating of the panel P increases the ability of the strip P to be formed non-elastically to insure that the forming operation will permanently set the panel P. The heaters 38, 38′, 116 and 116′ lie closer to the flange 306 and channel 308 than the web 307. This insures that the flange 306 and channel 308 will be heated to a higher temperature than the web 307 so that the flange 306 and channel 308 can elongate sufficiently without tearing for the panel P to be formed. It will be understood that the time of heating will vary with material and thickness of the strip P, however, it has been found that a heating period of 8–12 seconds is sufficient for a relatively thin thermoplastic material.

After a pre-set, selectively variable period of time has elapsed, the timing relay TR1 transfers thereby transferring the switch arm 325 to open contact TR1–1 and close contct TR1–2. This causes the heaters 38, 38′, 116 and 116′ to be de-energized and also de-energizes solenoids 32 and 32′ to pivot the support tables 51 and 51′ out from under the panel P so that the panel P can be formed. The closing of contact TR1–2 opens the valves V2 and V5 to cause the piston rods 128 and 128′ to be retracted and form or bend the panel P around the supports 66 and 66′ and form the side walls of the drawer. This places the forward edges of the thus formed strip P into the recesses 301 and against the fastening shoulders 302.

It will be noted that the softened portions of the strip P at the bends 312 and 312′ increase the ability of the strip P to bend non-elastically so that a permanent set takes place. As the strip P is formed around the rounded corners 69 and 69′ of the supports 66 and 66′ and into contact with the legs 66b and 66b′, the areas of contact between the supports 66 and 66′ are made of metal or some other heat conductive material, the rate of heat dissipation from the panel P is increased, thereby rapidly cooling the heated material in the bends 312 and 312′ to insure that the formed set in the strip P will be retained.

The operator then makes any necessary alignment of the heated ends of the panel P with the shoulders 302 of the drawer front F and depresses the foot switch SW1. This opens valves V3 and V6 and retracts piston rods 206 and 206′ to pivot the fastening assembly 191 into operative condition.

The forward edges of the panel P may be fastened to the shoulders 302 in any number of a variety of ways, such as by an adhesive, by stapling or by a combination thereof. The particular method illustrated in the drawings is by stapling, however, it is understood that appropriate modifications may be made to utilize other types of fastening devices.

As the stapling machines 201 and 201′ are pivoted into operating position, the deforming anvils 204 and 204′ engage the forwardmost ends of the panel P and deform them into the locking slots 305 in the drawer front F. Since these ends have been softened by the heaters 38 and 38', the deformation thereof makes a permanent set therein. This set is further insured by the rapid cooling of the panel P in contact with the anvils 204 and 204'. It is to be understood that a drawer can be manufactured without this feature; however, the overall rigidity of the drawer is increased by the use thereof.

After the stapling machines 201 and 201' are in operating position, the operator depresses push-button switch PB-1 to activate solenoids S1 and S2 and insert staples S through the strip P and into the shoulders 302 to firmly attach the strip to the drawer front F.

The drawer making operation is now complete. The operator releases the switch SW1 which extends the piston rods 90, 90', 128, 128', 206 and 206' to release the drawer. The operator then removes the completed drawer from the machine.

Figure 14:
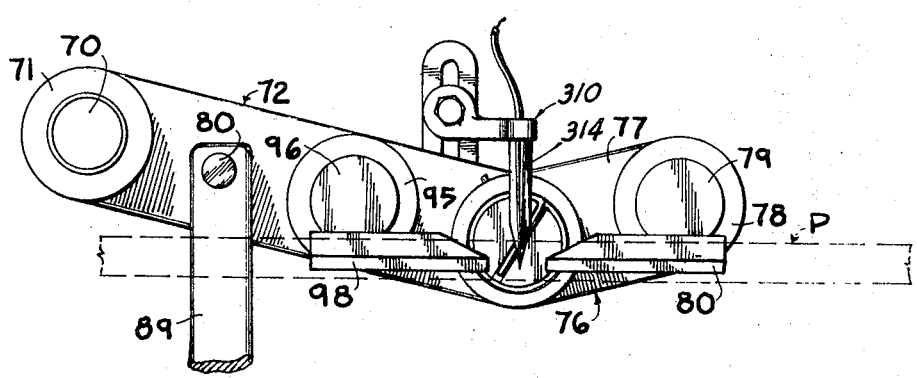
FIG. 14 is a view similar to FIG. 9 and illustrating a modified form of the present invention in which a knife is utilized for cutting the corner portion of the panel, prior to the panel being bent to the configuration of FIG. 13.

In the second embodiment of the machine as shown in FIG. 14, the operation is substantially the same as the first embodiment. The only difference is that the heated knives 314 slit the flange 306 when the primary links 72 and 72' are lowered. The notches 311 are then formed as the strip P is bent around the supports 66 and 66'. After the operator removes the second embodiment of the drawer from the machine, he installs the inserts 315 in the notches 311 to strengthen the flange 306.

In FIG. 16, the drawer, as it is assembled in the machine, is illustrated. During the period in which the transverse increments I are being heated, the operator inserts a drawer guide D, as indicated in FIGS. 16 and 17. This guide D includes an end hook which is connected to one end of an inverted U-shaped channel 501. The channel is inserted in an appropriate notch N at the center of the panel P and is stretched parallel to the edges of the bottom B, midway therebetween. The drawer guide is approximately the same length as bottom B and therefore terminates adjacent the front F. A nail passed through the front end portion of the guide, at an angle, secures the guide D to the bottom surface of bottom B, as seen in FIG. 18. This nail 502 may pass through the bottom B, alone or through the bottom B and into the front F.

It will be understood that the panel P may be formed of an extruded plastic material or a cast or molded plastic material, as desired. Furthermore, the front F may be of plastic or wood while the bottom B may, likewise, be of plastic or wood.

It will be obvious to those skilled in the art that many variations may be made in the embodiments chosen for the purpose of illustrating the present invention without departing from the scope thereof as defined by the appended claims.

What is claimed as invention is:

1. In an automatic drawer assembling machine for shaping and assembling certain components of a drawer;
    (a) first support means for supporting a drawer front in a position such that the opposed ends of said drawer front project toward opposite ends of such machine;
    (b) second support means for supporting a panel of deformable material in spaced relationship on one side of said drawer front and with the ends of said sheet projecting in the same directions as the ends of said drawer front;
    (c) third means for deforming transverse increments of said panel and for moving the ends of said panel toward said drawer front sufficiently for the ends of said panel to abut the end portions of said drawer front; and
    (d) means for securing the end portions of said panel and said drawer front together.

2. The structure defined in claim 1 wherein said drawer front is disposed in a plane and including means for supporting a drawer bottom in a position approximately perpendicular to the plane of said drawer front, said third means also causing said panel to be bent around that portion of said drawer bottom which is outwardly of said drawer front.

3. The structure defined in claim 2 wherein said second means includes a surface portion of which is approximately parallel to and spaced from said drawer front and wherein said third means includes a heating element for heating a narrow transverse portion of said panel adjacent said surface and includes a deforming means for deforming said panel about said surface.

4. The structure defined in claim 3 wherein said fourth means includes a stapler, means for moving said stapler, toward and away from the end portion of said drawer front, and control means for actuating said means for moving said stapler and control means for actuating said stapler when said stapler is adjacent the juxtaposed end portions of said panel and said drawer front.

References Cited

UNITED STATES PATENTS 2,173,045    9/1939    Sirois.

THOMAS H. EAGER, Primary Examiner

U.S. Cl. X.R.

29—208